United States Patent
Stickler et al.

(10) Patent No.: US 8,236,402 B1
(45) Date of Patent: Aug. 7, 2012

(54) DUAL TRAPEZOIDALLY-SHAPED URINAL COLLECTING PAD

(76) Inventors: R. Dean Stickler, Fort Lauderdale, FL (US); Jeffrey S. Crevier, Fort Lauderdale, FL (US)

( * ) Notice: Subject to any disclaimer, the term of this patent is extended or adjusted under 35 U.S.C. 154(b) by 0 days.

(21) Appl. No.: 13/171,810

(22) Filed: Jun. 29, 2011

(51) Int. Cl.
*B32B 3/02* (2006.01)
*E03D 11/00* (2006.01)

(52) U.S. Cl. .......................... 428/80; 4/251.1

(58) Field of Classification Search .............. 428/80, 428/81; 4/251.1, 251.2, 254, 256.1, 581, 4/582, 583; 442/59, 96, 123, 125, 171, 333, 442/394, 396, 399, 414, 320; 604/358, 359, 604/360, 385.1, 386, 393, 389; 5/417, 420; D6/582, 583, 592

See application file for complete search history.

(56) References Cited

U.S. PATENT DOCUMENTS

| 6,265,084 B1 | 7/2001 | Stickler |
| 6,787,210 B2 | 9/2004 | Stickler |
| 2009/0158512 A1 * | 6/2009 | Stickler et al. ................. 4/251.1 |

* cited by examiner

*Primary Examiner* — Catherine A Simone
(74) *Attorney, Agent, or Firm* — Malin Haley DiMaggio Bowen & Lhota, P.A.

(57) ABSTRACT

An inexpensive and disposable urine collecting pad for placement on a floor surface directly below a urinal for collecting fluid not deposited within the confines of the urinal which would otherwise drip on the floor. Fluid collected by the pad is prevented from reaching the underlying floor area thereby eliminating the problems associated with fluids being deposited on the floor. The pad includes an upper fluid collecting layer of material and a lower non-skid fluid impervious layer of material that are glued together. The configuration of the pad includes a dual end, each end having a trapezoidal shape with flat parallel ends and tapered sides so that the urine collecting pad cannot be improperly aligned during installation. The trapezoidal and tapered side edges allow a person to stand in front of the urinal without the person's shoes standing on the collecting pad.

2 Claims, 2 Drawing Sheets

DUAL TRAPEZOIDALLY-SHAPED URINAL COLLECTING PAD

BACKGROUND OF THE INVENTION

1. Field of the Invention

This invention relates generally to commercial urine collecting pads or mats placed under a urinal used in a men's bathroom to absorb urine and, specifically, for a commercial urinal mat disposed on the floor below a urinal that can protect a floor surface from sprayed urine and is shaped for error free alignment below the urinal.

2. Description of Related Art

Unsanitary conditions often exist in private and public bathrooms especially around urinals that men use for urination. Splattered urine can collect on the floor surface around or near a urinal causing very unsanitary floor conditions that can result in foul odors and collection of germs.

U.S. Pat. No. 6,265,084 issued July, 2001 describes a urine collecting pad that is used with a urinal that accommodates the position of the user's shoes to not contact the mat. The collecting pad shown is quite effective in protecting the floor from urine provided the urinal pad is properly aligned beneath the urinal. The invention described herein is shaped to ensure that the disposition of the urinal pad is properly aligned beneath the urinal.

SUMMARY OF THE INVENTION

A fluid collecting pad (primarily urine) for placement on a floor surface below a men's urinal. The urine collecting pad is shaped to provide two parallel, tapered ends, each of which is shaped as a trapezoid with the larger parallel wall dissecting the middle of the pad. Fluids collected by the pad are thus prevented from reaching the underlying floor area surrounding the urinal. The trapezoidal end shape on the collecting pad allows a urinal user to comfortably position his feet on the floor along the tapered non-parallel pad walls so as to not place the user shoes on the pad surface itself and ensuring at installation, the pad will be properly aligned and positioned to collect urine.

The collecting pad is construed of a laminate that includes a top liquid retaining felt or fibrous layer glued to a fluid impervious non-skid bottom layer such as rubber artificial rubber or synthetic material, both of the layers being glued together as a laminate, with the felt being on top and the fluid impervious non-skid rubber layer being on the bottom.

By having a symmetrical trapezoidally-shaped dual ended collecting pad, with flat parallel ends that are tapered, the fluid collecting pad is easily positioned by men's room maintenance personnel in a proper position below each urinal. The flat surface at either end of the collecting pad abuts a straight wall surface. Thus, either end of the collecting pad can be positioned parallel to the wall and abutting a wall resulting in the correct positioning of the fluid collecting pad beneath the urinal.

The purpose of the configuration of the fluid collecting pad is to allow a person to stand over a urinal flush bowl such that his feet or shoes do not contact the collecting pad while, at the same time, a significant portion of the collecting pad is projecting beneath the urinal in such a way as to collect fluids resulting from the use of the urinal to prevent fluids from striking the floor. The first layer of the pad may also include an antibacterial agent and an agent for eliminating odor while providing a pleasing fragrance. The configuration of the collecting pad is specifically shaped wider in the middle and positioned so as to collect substantially all of the fluid not deposited within the urinal that would otherwise become deposited on the floor. The second layer of fluid impervious material prevents fluids from penetrating the top felt pad and reaching the underlying floor. The bottom layer of the fluid collecting pad also prevents the pad from skidding or sliding away from the urinal. The collecting pad stays dry over time because of evaporation of retained liquids.

It is an object of this invention to provide a urine collecting pad for use on the floor surrounding and below a urinal having a dual trapezoidal shape to protect the floor from receiving deleterious fluids such as urine.

It is another object of this invention to provide a non-skid urine collecting pad that fits conveniently in either direction end-to-end under a urinal as it contacts the floor area to protect the floor area from receiving urine or other deleterious liquids to prevent positioning the pad in an incorrect position or alignment under the urinal.

In accordance with these and other objects which will become apparent hereinafter, the instant invention will now be described with particular reference to the accompanying drawings.

PREFERRED EMBODIMENT OF THE INVENTION

Figure 1:
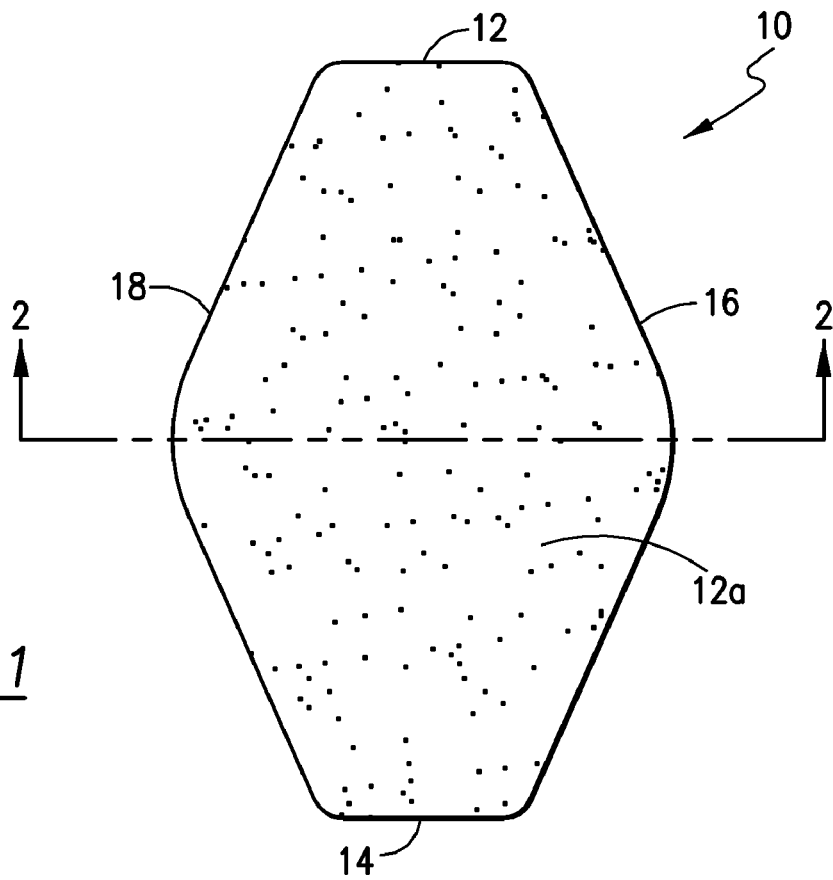
FIG. 1 shows a top plan view of the present invention.
Figure 2:
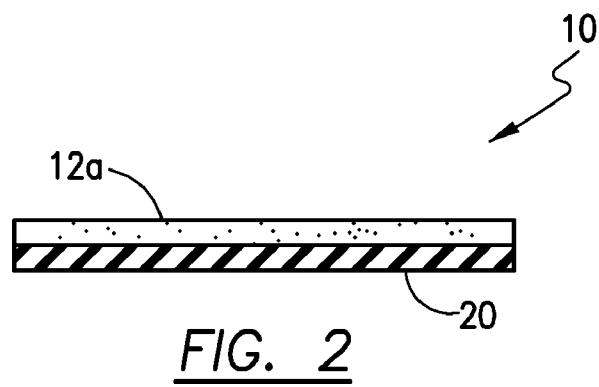
FIG. 2 shows a side elevational view in cross section partially cutaway of the present invention.
Figure 3:
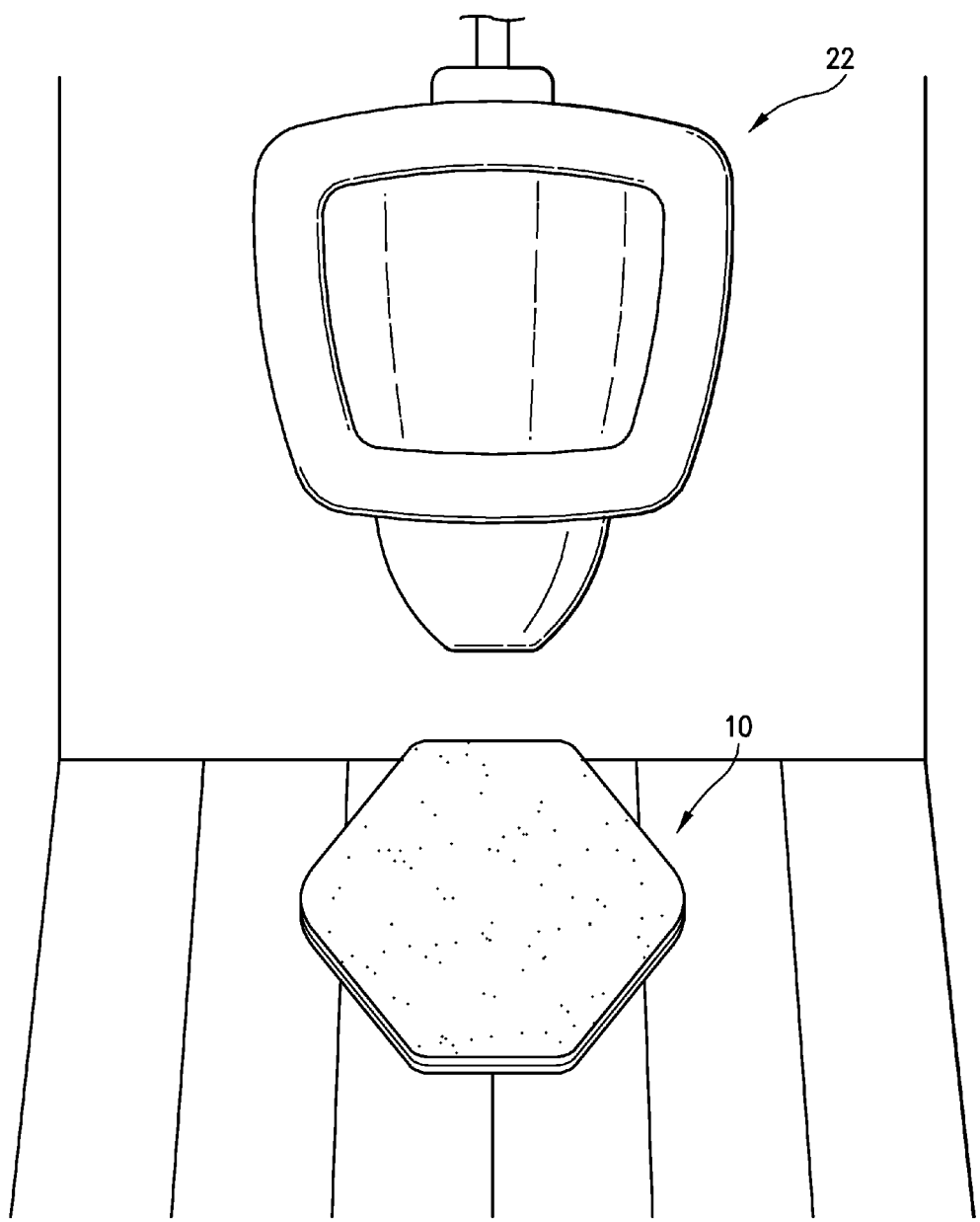
FIG. 3 shows a perspective view of the dual ended trapezoidally shaped collecting pad mounted on a floor below a urinal.

Referring now to the drawings and, in particular, FIGS. 1 through 3, the present invention 10 is shown as a dual end trapezoidally-shaped fluid collecting pad 12 that is multilayered includes a top felt layer 12 that has an upper surface 12a that collects fluids such as urine that over time evaporate. The top end 12 is parallel to the bottom end 14 such that both ends of the pad 10 form a pair of trapezoids separated by an imaginary lateral line across the middle of the pad between side 16 and side 18. The tapered sides 16 and 18 allow for a user standing in front of the urinal to place each foot and shoe parallel to the tapered edges on each side of the pad without having to have the shoes physically touch the urinal pad. By having both ends of the urinal pad 10 shaped as a trapezoid, a maintenance person installing the urinal pad beneath a urinal will readily provide the proper alignment since each narrow flat end is essentially identical. In other words, the flat straight end 12 would be pushed against a flat wall surface beneath the urinal or the pad 10 can be rotated 180° so that the flat end 14 is placed flush against a wall beneath a urinal. Therefore the alignment will always be correct regardless of which flat end is used.

Referring now to FIG. 2, the construction of the urine collecting pad is shown comprised of an upper layer of material 12a that is made of a fluid collecting material such as felt or felt-like polypropylene fibers that is glued to a rubber or rubber like mat 20 that is also liquid impervious and non-skid so that the pad 10 will not readily move across the floor surface. The second layer 14 of rubber or synthetic rubber or synthetic material prevents fluids such as water or urine from penetrating through the pad 10 and reaching the underlying floor.

The pad as shown in FIG. 1 has dual parallel ends 12 and 14 that are essentially trapezoidally-shaped so that the pad 10 is much narrower at each end 12 and 14 than it is across the middle laterally between side 16 and side 18. The trapezoidal ends 12 and 14 provide sufficient tapered narrowness so that a person could stand comfortably over the urinal bowl without his shoes or feet engaging the surface of the collecting pad 10. However, because of the configuration and shape of pad 10 and especially the middle area, there is plenty of pad area for collecting stray fluids and preventing the fluids from reaching the floor around the urinal.

FIG. 3 shows the collecting pad 10 employed around under a urinal 22. The urine collecting pad 10 is made of a non-expensive and disposable multi-layer laminate. As stated above, the felt layer or felt-like layer can be any type of fluid collecting material that allows the fluid to evaporate over time. The felt 12*a* could contain an anti-bacterial solution and/or a pleasing fragrance to eliminate any odors of the urine or other fluids that are collected on the upper layer 12*a*. The rubber or other non-skid liquid impervious layer 20 that is used on the bottom prevents any liquids from reaching the floor that are trapped in the collecting pad and acts as a non-skid.

Referring back to FIG. 1, the size of the pad 10 could be varied depending on the urinal size or different type unique configurations. The overall configuration in shape is important to ensure that the collecting pad is properly aligned when installed below a urinal.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A disposable and inexpensive floor mounted pad for placement on a floor surface directly below a urinal for collecting and evaporating urine comprising:
    a pad body including a first layer of fluid collecting material;
    a second layer fluid impervious material bonded to said first layer of fluid collecting material, said second layer having a connecting side and a floor side and being constructed of a non-slip fluid impervious material;
    adhesive material on the connecting side of said second layer thereby bonding said first layer of fluid collecting material to said second layer of fluid impervious material; and
    said pad body being constructed in a substantially flat pad having dual identical and opposing parallel ends, each parallel end having mirror image sidewalls that taper as they approach the respective parallel end such that said pad body has opposing trapezoidally-shaped portions and is properly aligned when installed with either parallel end below the urinal.

2. A floor mounted pad as in claim 1, wherein:
    said pad includes a felt layer on top and a synthetic bottom layer that is liquid impervious and non-skid against a floor surface.

\* \* \* \* \*